United States Patent [19]
Fenske

[11] 3,871,535
[45] Mar. 18, 1975

[54] VEHICLE HITCH

[76] Inventor: Joseph G. Fenske, 5929 W. 149th St., Brook Park, Ohio 44142

[22] Filed: Jan. 2, 1974

[21] Appl. No.: 430,041

[52] U.S. Cl............................ 214/86 A, 280/479 A
[51] Int. Cl.............................................. B60p 3/12
[58] Field of Search... 214/86 A; 280/478 R, 479 A, 280/482, 490 R, 490 A, 491 A

[56] References Cited
UNITED STATES PATENTS
1,512,429  10/1924  Loudon............................ 214/86 A
3,690,482  9/1972  Gaumont........................... 214/86 A Primary Examiner—Albert J. Makay

[57] ABSTRACT

A vehicle hitch adapted to be mounted on the rear of a towing vehicle and having a swivelly mounted boom extanding rearwardly thereof, freely swingable both vertically and horizontally; said boom having coupling means at the free end thereof capable of engaging and locking to a vehicle to be towed and lifting the engaged end of said vehicle off the ground even tho the two vehicles were not aligned at the start of the coupling operation.

2 Claims, 6 Drawing Figures

VEHICLE HITCH

Conducive to a better understanding of the invention it may be well to point out that when one is traveling in a family motor-coach, upon reaching a destination, there is no means available for local travel as there is with a trailer unit whose automobile can be disconnected, and used separately.

However, the problem may be solved by towing a small automobile, such as a Toyoto, behind the motor-coach with two of its wheels raised off the ground, making it eligible for travel on all freeways and toll roads.

The primary object of the invention is to provide a vehicle hitch that can be made to engage the vehicle that is to be towed and lift the coupled end thereof off the ground even though the towing vehicle and the vehicle to be towed are not closely aligned at the start of the coupling operation.

A further object is to provide a structure of the type stated requiring no actual physical lifting of the end of the car being towed by the person involved.

These, and other objects of the invention will become apparent from a reading of the following specification and claims, together with the accompanying drawings, wherein like parts are referred to and indicated by like reference numerals, and wherein:

Figure 3:
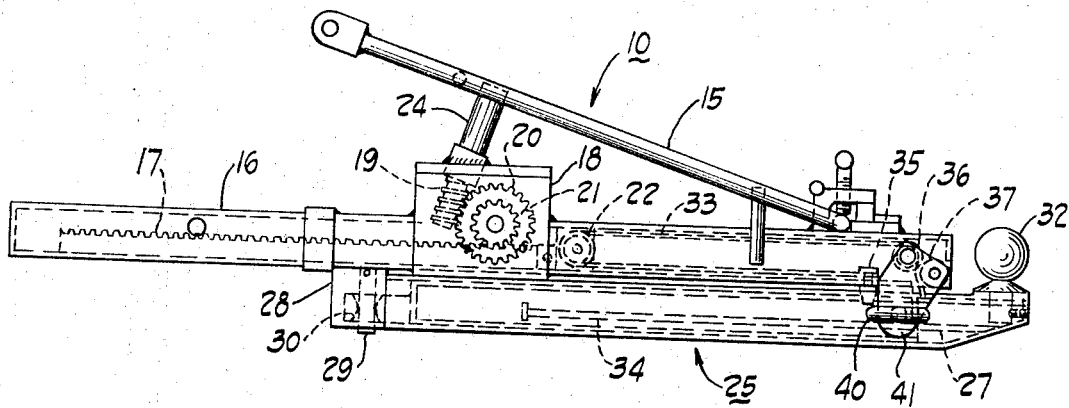
FIG. 3 is a side view, partly in section, of the vehicle hitch in its fully contracted and locked condition.
Figure 6:
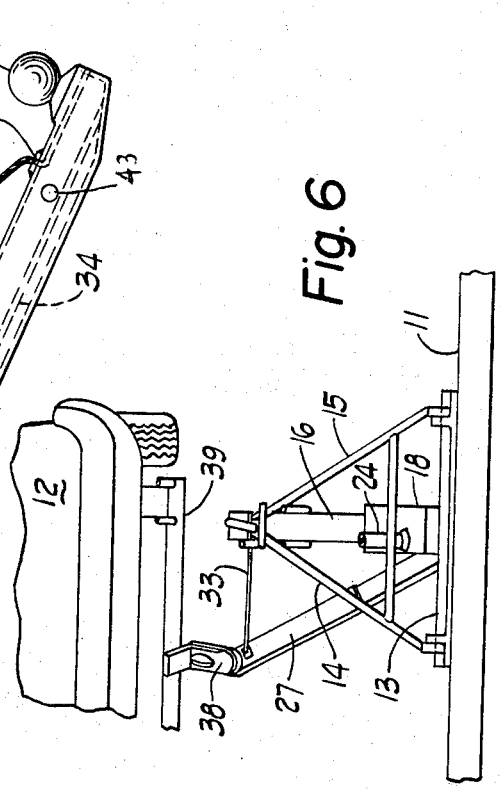
Figure 5:
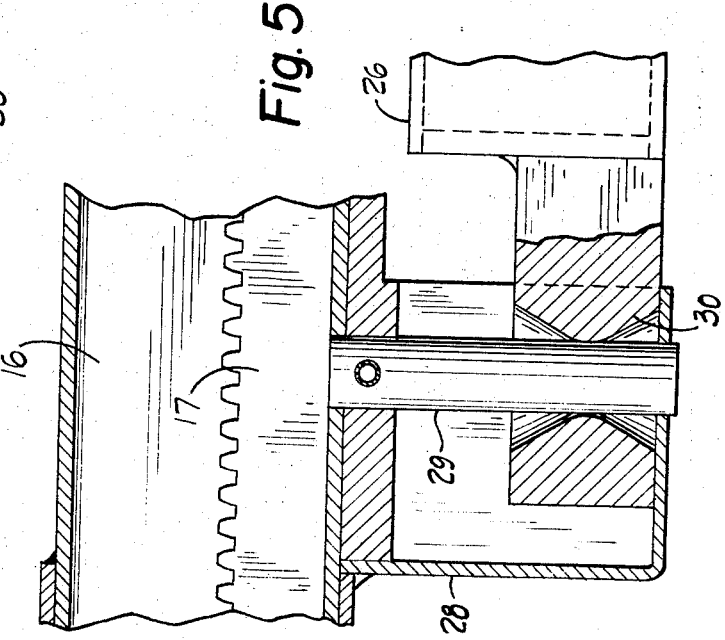

FIG. 5 is an enlarged view, partly in section, of the swivel hinge area of the fully retracted vehicle hitch shown in FIG. 3; and, FIG. 6 is a top plan view showing the motor home and the passenger car to be towed with their longitudinal center-lines offset relative to each other, as they appear when coupled together through the vehicle hitch boom in its extended and swiveled condition, immediately prior to the raising and aligning operation.

Figure 1:
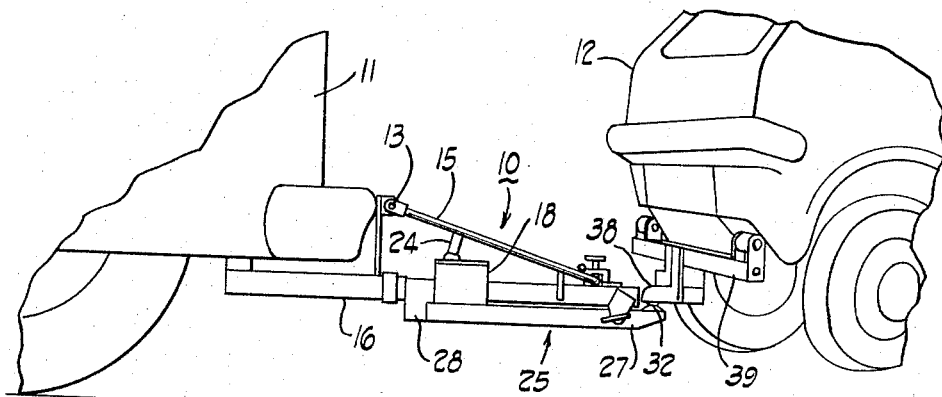
FIG. 1 is a perspective view showing the rear portion of a motor home and a passenger car coupled thereto, with its rear wheels raised above the road, by the utilization of the vehicle hitch device of my invention.

Referring more particularly to the drawing, there is seen in FIG. 1 the vehicle hitch that is the subject of the invention, broadly indicated by reference numeral 10, as it appears mounted on the rear of a motor coach home 11 connected to a passenger car 12 which is held and towed with its resr wheels suspended out of contact with the road surface.

The vehicle hitch 10 comprises an elongated rigid hollow beam 16 which is mounted on the rear of the motor home 11, extending rearwardly thereof in a horizontal plane.

A pair of brace-rods 14 and 15, anchored on a bar 13 mounted on the motor home rear, spaced upwardly of the beam 16, support the free end of the beam; rigidly maintaining it in an immovable horizontal plane.

Figure 4:
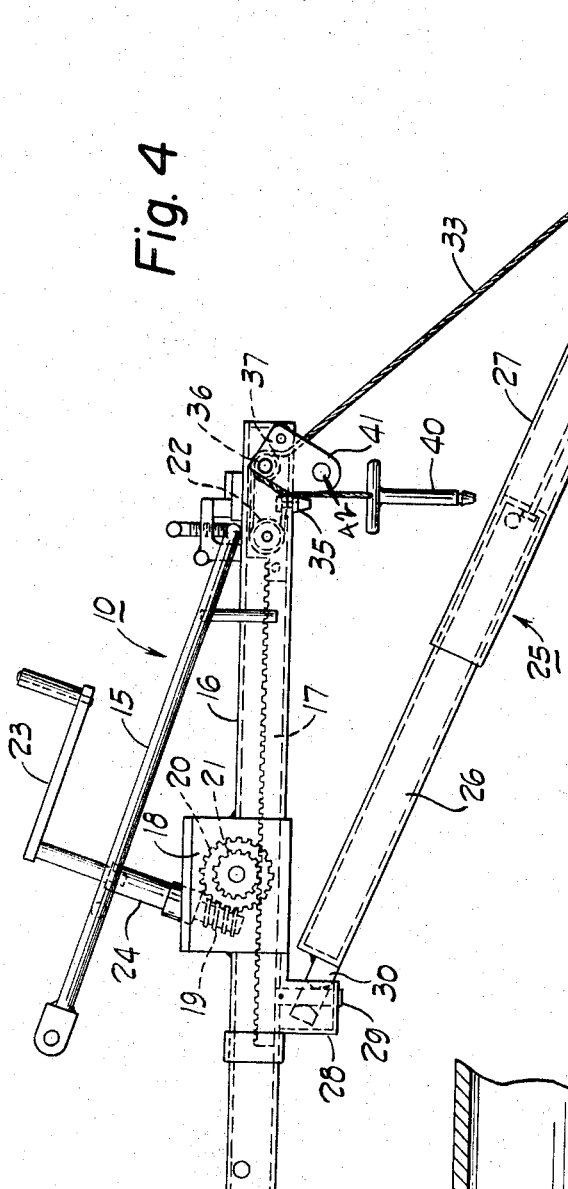
FIG. 4 is a side view, partly in section, of the vehicle hitch in its unlocked and fully extended condition, free to be swung in an arcuate path.

A toothed rack 17 is slidably mounted within the beam with a pulley 22 rotatably mounted at the forward end thereof, as seen most clearly in FIGS. 3 and 4.

Reference numeral 18 indicates a gear housing mounted on the beam 16 midway of the travel path of the rack 17, containing a worm and gear train 19-20-21 which engages the rack teeth and is operable at a 40 to 1 ration to move the rack 17 back and forth when the worm shaft 24 is manually rotated by crank 23, as seen in FIG. 4.

Reference numeral 25 indicates a tow bar, or boom, that is hingedly and tiltably mounted on the underside of the beam 16, for a purpose to be disclosed hereinafter.

The boom 25 is made of two elongated, hollow, telescopically interfitted steel tubes 26 and 27 of substantially square cross-section.

The inner tube 26 is hingedly and swivelly mounted at one end to the underside of the beam 16, by means of bore 30 having two opposed cone shaped sections which engage a vertical pin 29 mounted on the underside of beam 16 in a hinge box 28, as is seen most clearly in FIG. 5.

Figure 2:
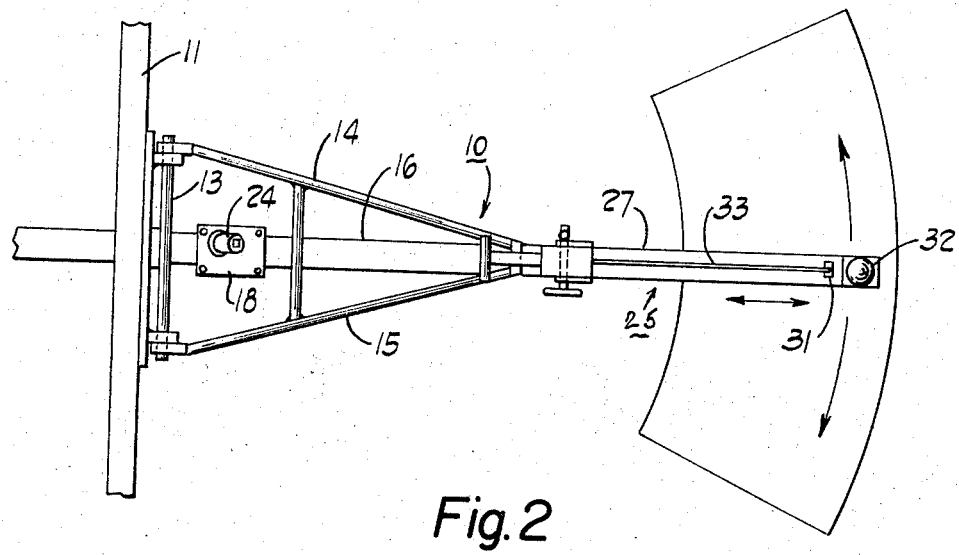
FIG. 2 is a top plan view of the vehicle hitch in its fully extended condition.

This "swivel-hinge" construction permits the boom 25 to freely swing in both horizontal and vertical planes relative to the stationary beam 16, as seen in FIGS. 2 and 4.

The outer tube 27 has a coupling ball 32 mounted at the extreme end thereof, and is limited in its maximum outwardly movement relative to the inner tube 26 by a headed stop rod 34, as seen most clearly in FIG. 4.

Reference numeral 33 indicates a steel cable that has one end anchored by clamp means 35 at the free end of beam 16, as seen in FIG. 3. The cable travels rearwardly to and around the rack pulley 22, then forwardly over, between and downwardly of two pulleys 36 and 37, mounted within the beam 16 at the free end thereof. After passing between the pulleys 36 and 37 the cable 33 travels downwardly to the free end of the tube 27 of boom 25, proximate the ball 32, and is secured thereto by anchor means 31.

When the vehicle hitch 10, that is the subject of this invention is in its fully retracted condition, ready to tow a vehicle, not shown, as seen in FIG. 3, it will be noted that the rack 17 is positioned at its maximum distance from the free end of beam 16.

At the same time this retracted position of the rack 17 causes the pulley 22, around which the cable 33 travels, to pull the cable twice the length of the distance traveled by the rack, thereby drawing the boom 25 snuggly up against the underside of the beam 16 between the spaced sides of the bracket 41.

The so positioned boom 25 is locked in place by inserting a pin 40 through aligned holes 42 and 43, respectively, in the bracket 41 and the boom 25.

The vehicle to be towed, indentified by reference numeral 12 in FIG. 1, has a cap 38 mounted on its frame 39 adapted to be engaged by the ball 32 of the boom 25 in the conventional interlocking fit.

The following steps are taken when it is desired to cooupled a four wheeled behicle 12 to a motor home 11 with the rear wheels of the vehicle being towed held in raised position, out of contact with road, as seen in FIG. 1.

First, the lock pin 40, as seen in FIG. 4, is removed freeing the boom 25 for movement relative to the stationary beam 16.

The crank 23 is fitted to the worm shaft 24, as again seen in FIG. 4.

Rotation of crank 23 acts to move the toothed rack 17 and the terminal pulley 22 mounted thereon to the free end of the beam 16, approximately 2 feet, thereby permitting the cable 33 to travel twice that distance, or 4 feet, downwardly between the paired pulleys 36 and 37 at the free end of beam 16.

As a result the end of the boom 25 attached to the cable 33 is free to tilt both downwardly and laterally relative to its hinge pin 29 and the beam 16. At the same time the outer tube 27 of the telescopic boom 25 is free to be pulled outwardly of the inner tube 26, thereby lengthening the boom 25, as seen in FIGS. 2, 4 and 6.

The car 12 to be towed is backed up into approximate alignment with the center line of the beam 16. The alignment can be off approximately 30° in each direction, as seen in FIGS. 2 and 6, since the extended boom 25 is free to swing in a horizontal arc.

As again seen in FIG. 6, the anchor ball 32 of the boom 25 is fitted under the ball cap 38 of the vehicle 12. When the hitch 10 has been so connected to the vehicle 12 rotation of the crank handle 23 will act to pull the vehicle 12 into exact alignment with the motor home 11 and lift the wheels of the towed vehicle off the ground, as seen in FIG. 1.

As the pull of the cable lifts the wheels free of the ground the cable 33 acts to pull the end of the boom 25, and the vehicle 12 connected thereto, into alignment with the motor home beam 16.

The 40-1 ratio of the gear train 19-20-21 permits a weight of 1,500 pounds to be easily lifted by one person.

When the toothed rack 17 has been moved to the fully retracted position shown in FIG. 3 the boom 25 will be in alignment with the under face of the beam 16, with its free end nested in the lock bracket 41. Insertion of the lock pin 40 will then put the hitch 10 in proper condition for the towing operation.

While the so connected car 12 may still be at a slight angle to the motor home 11, it will immediately swivel on the ball 32 and straighten out upon the forward movement of the motor home and remain in perfect alignment therewith.

The telescopic action of the boom 25 permits the car 12 to be originally contacted by the hitch 10 at a convenient distance, and then drawn toward the beam 16 and held a safe 2 feet from the motor home during the towing operation. Changing the pivot point (ball 32) from the towed vehicle to the towing vehicle reduces the possibility of jack-knifing.

Having thus described the preferred embodiments of the invention it should be understood that numerous structural modifications may be resorted to without departing from the spirit of the invention.

I claim:

1. A vehicle hitch for connecting a towing vehicle to a vehicle to be towed, comprising in combination:
   a. a stationary hollow beam mounted on the rear frame of the towing vehicle, extending rearwardly therefrom in a horizontal plane;
   b. a boom swivelly mounted on the underside of the beam for free swinging movement in both vertical and horizontal planes;
   c. said boom comprising two telescopically interfitted inner and outer sections;
   d. the outer section having a ball adapted to be engaged by a tow cap mounted on the vehicle to be towed;
   e. the telescopic boom being of a length such that the ball will be positioned immediately beyond the free end of the beam when the boom is in its fully retracted condition;
   f. a cable secured at one end to the beam and at its other end to the boom, proximate the ball; said boom end, supported by the cable, being free to swing in both vertical and horizontal planes relative to the beam;
   g. means for increasing the effective length of the cable to permit the boom to be lowered, lengthened and swung in both vertical and horizontal arcs, to allow the boom ball to engage the ball cap on the vehicle to be towed when the towing and towed vehicles are misaligned immediately prior to their joinder; and
   h. means for shortening the effective length of the cable to raise and shorten the overall length of the boom and move it into alignment with the beam, against the underside thereof, thereby lifting the rear wheels of the vehicle to be towed off the ground, with the rear axle thereof in exact alignment with the towing vehicle.

2. A vehicle hitch, as in claim 1, wherein the cable adjusting means comprises an elongated toothed rack slidably mounted within the beam; means for advancing and retracting the rack; said rack having a pulley at one end thereof, around which the cable travels between its ends anchored on the beam and boom; said pulley acting to pull the cable the length of the beam when the rack is in a first, retracted position, thereby causing the cable to draw and hold the boom in its fully retracted condition, in alignment with and proximate the underside of the beam; said pulley acting to allow the cable to be paid out of the hollow beam when the rack is in its advanced position, to permit the boom to be lengthened, lowered, and freely swiveled in both horizontal and vertical planes, to enable the ball to engage the ball cap of the vehicle to be towed.

* * * * *